JOURNAL BOX LID LIFTER

Filed March 2, 1959 13 Sheets-Sheet 1

INVENTOR.
CARLETON D. TILDEN
BY Bosworth, Sessions, Herrstrom & Knowles
ATTORNEYS.

May 15, 1962 C. D. TILDEN 3,034,453

JOURNAL BOX LID LIFTER

Filed March 2, 1959 13 Sheets-Sheet 2

INVENTOR.
CARLETON D. TILDEN
BY Bosworth, Sessions, Herrstrom & Knowles
ATTORNEYS.

Inventor
CARLETON D. TILDEN
BY Bosworth, Sessions, Herrstrom & Knowles
Attorneys.

INVENTOR.
CARLETON D. TILDEN
BY Bosworth, Sessions, Herrstrom & Knowles
ATTORNEYS.

May 15, 1962 C. D. TILDEN 3,034,453

JOURNAL BOX LID LIFTER

Filed March 2, 1959 13 Sheets-Sheet 5

Inventor

CARLETON D. TILDEN

By Bosworth, Sessions, Herrstrom & Knowles

Attorneys.

INVENTOR.
CARLETON D. TILDEN
BY Bosworth, Sessions, Herrstrom & Knowles
ATTORNEYS.

INVENTOR.
CARLETON D. TILDEN
BY Bosworth, Sessions, Herrstrom & Knowles
ATTORNEYS.

INVENTOR.
CARLETON D TILDEN
BY Bosworth, Sessions, Herrstrom & Knowles
ATTORNEYS May 15, 1962 C. D. TILDEN 3,034,453

JOURNAL BOX LID LIFTER

Filed March 2, 1959 13 Sheets-Sheet 9

INVENTOR.
CARLETON D. TILDEN
BY Bosworth, Sessions, Herrstrom & Knowles
ATTORNEYS.

INVENTOR.
CARLETON D. TILDEN
BY Bosworth, Sessions, Herrstrom & Knowles
ATTORNEYS.

May 15, 1962 C. D. TILDEN 3,034,453

JOURNAL BOX LID LIFTER

Filed March 2, 1959 13 Sheets-Sheet 11

INVENTOR.
CARLETON D TILDEN
BY Bosworth, Sessions, Herrstrom & Knowles
ATTORNEYS.

May 15, 1962 C. D. TILDEN 3,034,453
JOURNAL BOX LID LIFTER
Filed March 2, 1959 13 Sheets-Sheet 12
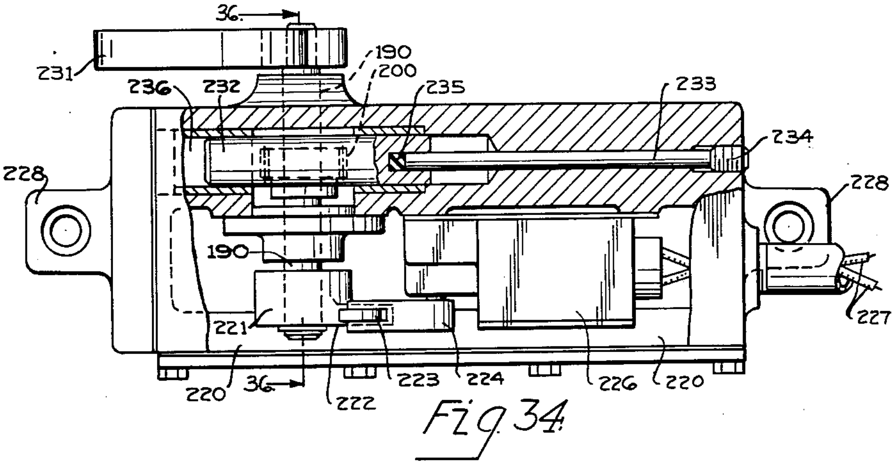
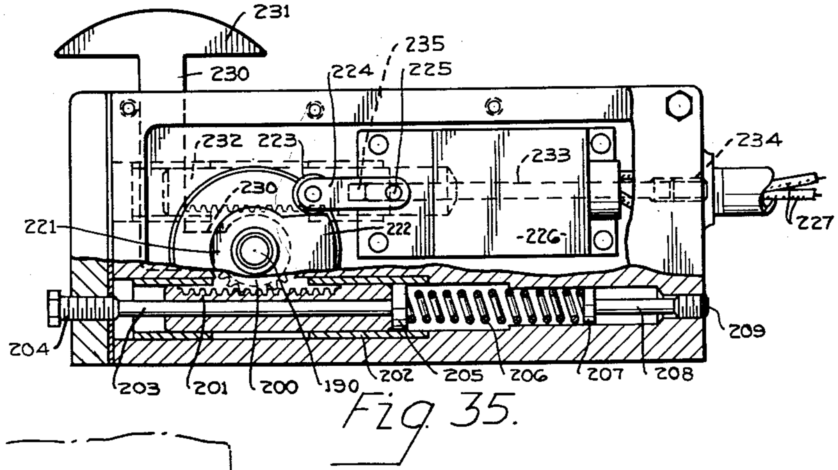
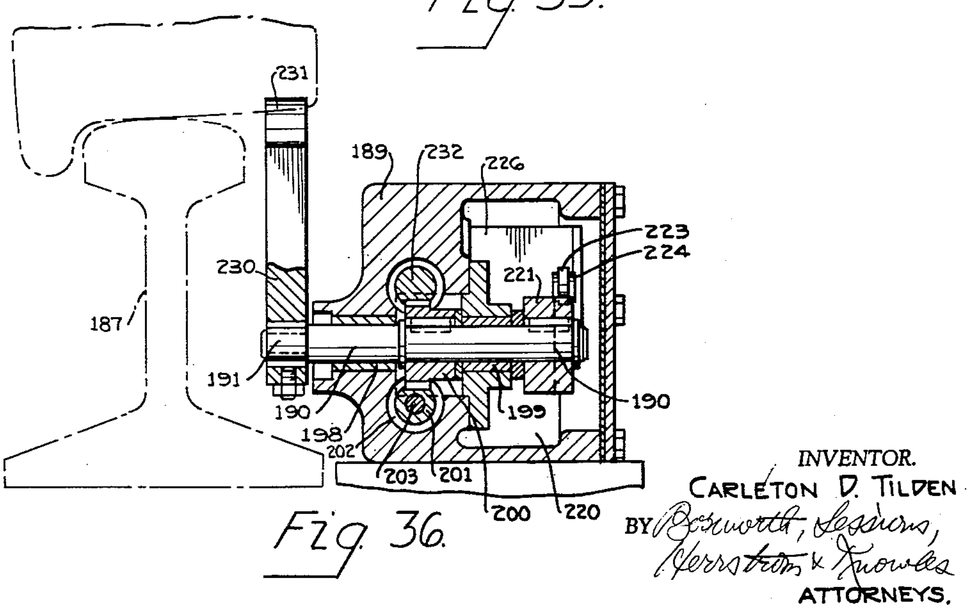
INVENTOR.
CARLETON D. TILDEN
BY Bosworth, Sessions, Herrstrom & Knowles
ATTORNEYS.

INVENTOR.
CARLETON D. TILDEN
BY Bosworth, Sessions
Herrstrom & Knowles
ATTORNEYS.

United States Patent Office 3,034,453
Patented May 15, 1962

3,034,453

JOURNAL BOX LID LIFTER

Carleton D. Tilden, Painesville, Ohio, assignor to The New York Central Railroad Company, a corporation of Delaware Filed Mar. 2, 1959, Ser. No. 796,660
20 Claims. (Cl. 104—26)

This invention relates to lid-lifting apparatus for a railway car journal box and, more particularly, to a lid-lifting machine capable of operating automatically in response to the approach of the car.

In general, a lid-lifting machine of the kind to which the invention relates can be employed to a maximum advantage in a railway yard where cars are to be serviced, as, for example, by oiling movable parts. Usually, but not necessarily, the machine will be installed on the ascending side of a "hump" where the speed of the car or cars is low and likely to be more or less uniform. By making use of suitably located sensing means, it therefore becomes possible to operate the lid-lifting machine in timed relation to the position of the car. This in turn makes it possible to bring the lid-lifting elements into contact with the lid to be lifted at a time when the journal box of which the lid forms part is substantially abreast of the lid-lifting machine.

With these considerations in mind, it is an object of the invention to provide a lid-lifting machine of a kind that will operate on a cyclical basis in response to actuation by suitable sensing means; e.g., switch gear associated with the track, as, for example, one or more track switches. The lid-lifting machine preferably is so designed that its cycle of operation takes it from a position of rest, the latter being its idle or normal position, carries it through a sequency of steps in the course of which the lid-lifting elements are brought into engagement with the lid to be lifted, and, after accomplishing the latter end, returns it to its idle position.

It is a further object of the invention to so relate the lid-lifting machine and the switch gear that the machine will be brought into operation only when a suitable control circuit is closed through one or more switches, usually a maximum of three, that are separated by a space equal to the longitudinal distance between axles in the truck of a standard railway car. Since in such a truck there is a journal box associated with the near end of each of two paired axles, the switches preferably occur in sets of three, including a first end switch and a middle switch that cooperate to close the circuit in time to permit the lid-lifting machine to act on one of the two journal boxes and a second end switch which, with the middle switch, closes the circuit in time to permit the machine to act on the other journal box.

It is a further object of the invention to provide a lid-lifting machine that will not operate but will remain idle upon the approach of a locomotive or other vehicle lacking the axle spacing characteristic of the standard railway car truck.

It is a further object of the invention to provide a lid-lifting machine of the kind described that will not be damaged in the event that the lid-lifting elements happen to come into contact with a ladder or steps at the near end of the approaching car. If engagement is with the ladder or steps rather than with the journal box, the machine as a whole may be damaged. Therefore, the invention contemplates mounting the lid-lifting machine for partial rotation to an extent sufficient to swing the vulnerable parts of the machine out of harm's way in the event that the machine fails to come into contact with the journal box as a result of premature engagement with some other object.

It is a further object of the invention to provide a lid-lifting machine in which the lid-lifting elements come first into contact with the body of the journal box itself and then, after such contact has been established, with the lid to be lifted. Inasmuch as not all journal boxes are of the same or similar design, the invention provides means whereby the lid-lifting element or elements will follow the outline of the journal box in a generally upward path until such time as they come into lifting engagement with the lid. To this end, as will appear, the invention provides a safety factor in the form of permissible parting movement between the lid-engaging means and the carriage or other parts by which such lid-engaging means are supported.

Other objects, advantages and features of the invention will be apparent from the description which follows and from the accompanying drawings, in which:

FIGURES 34 to 36 are views similar to those of FIGURES 31 to 33 showing a modified form of track switch.

Figure 1:
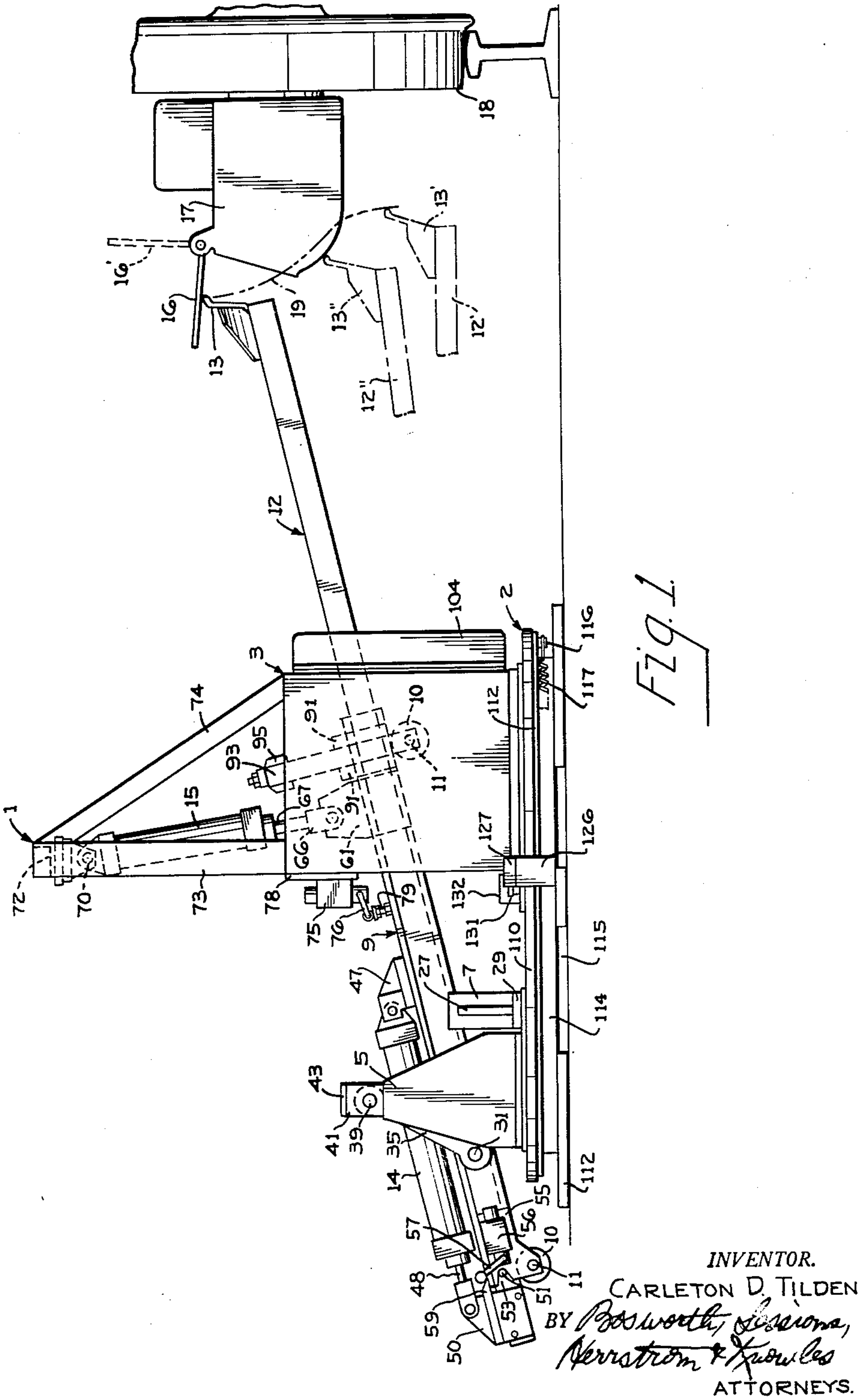
FIGURE 1 is a side elevation of the lid-lifting machine of the invention with minor components omitted in the interests of clarity of representation.
Figure 2:
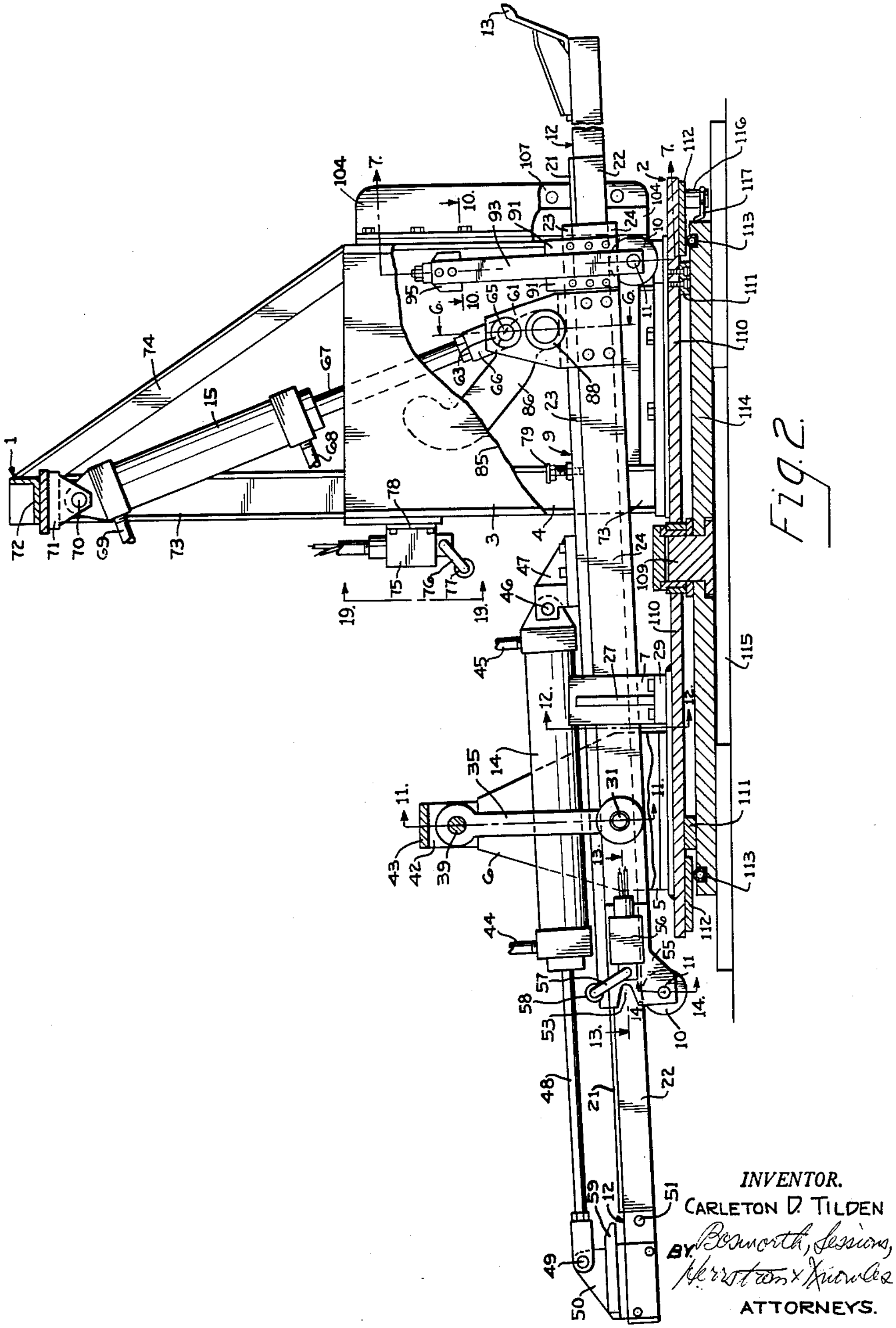
FIGURE 2 is a similar elevation on a larger scale with parts broken away and other parts in section.
Figures 3, 18:
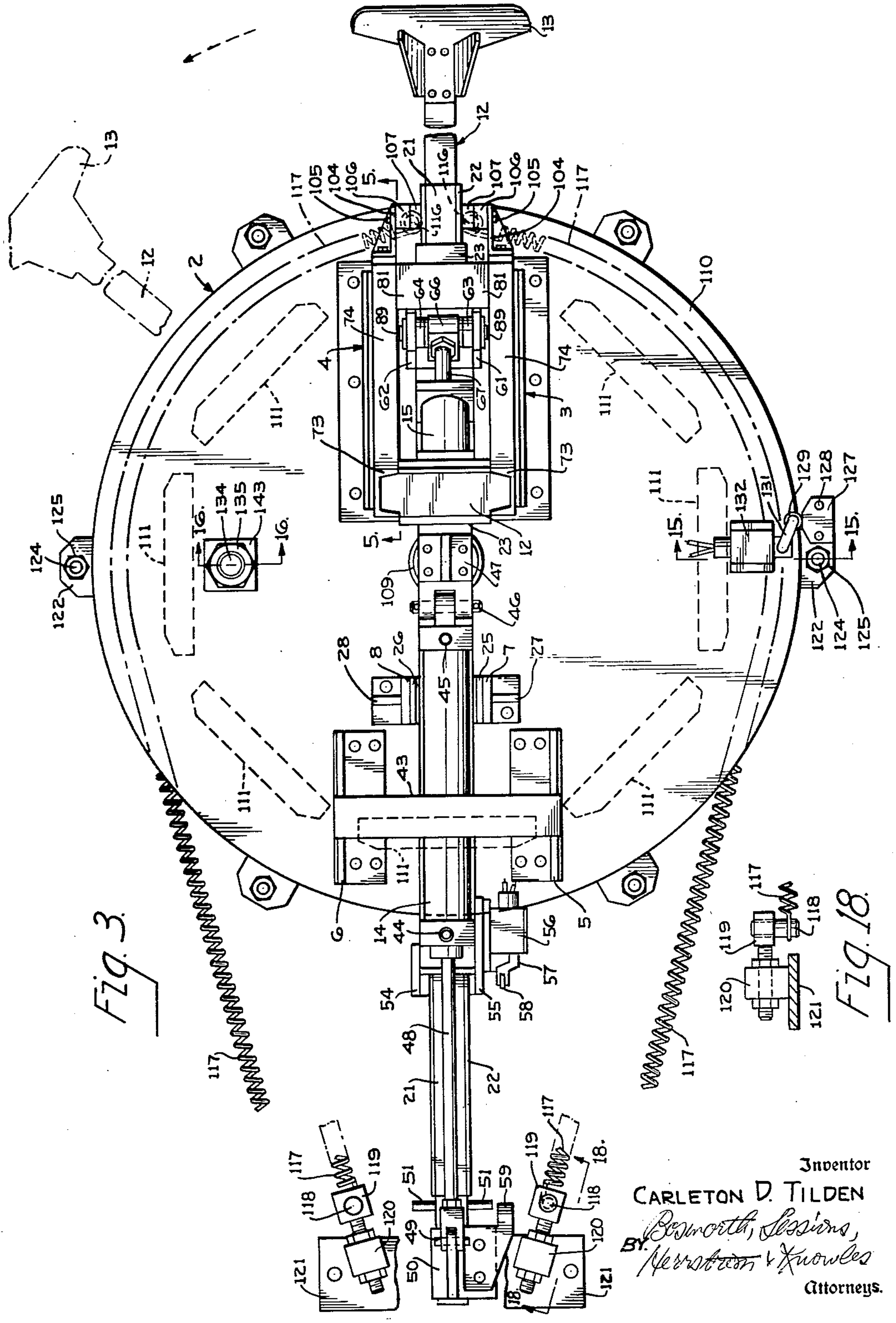
FIGURE 3 is a top plan corresponding to FIGURE 2.
FIGURE 18 is an elevation from line 18—18 of FIGURE 3.

As appears from FIGURES 1 to 3, the lid-lifting machine of the invention, generally designated 1, is provided with a circular base 2. Mounted on base 2 are two major side pieces 3 and 4, which are used for supporting certain hereinafter described components of the machine. Also located on base 2 are two minor side pieces 5 and 6, likewise for supporting certain components of the machine. Between major side pieces 3 and 4 and minor side pieces 5 and 6, but closer to the latter than to the former, is a guide cradle made up mainly of two side plates 7 and 8. Major side pieces 3 and 4, minor side pieces 5 and 6 and guide plates 7 and 8 are symmetrically disposed about a common axis: see FIGURE 3. Normally, this axis is the center line of the machine.

Figure 11:
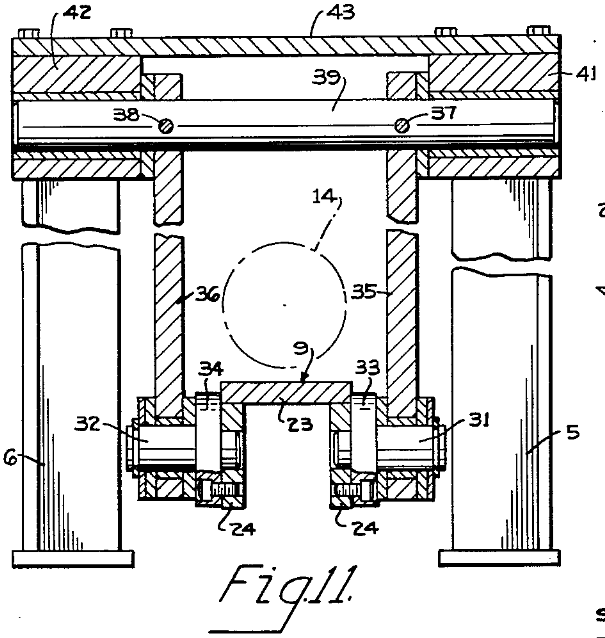
FIGURE 11 is a section on line 11—11 of FIGURE 2.

Supported over the center line of the machine is an inverted channel-shaped carriage 9, seen in cross section in FIGURE 11. Associated with carriage 9 in the manner indicated in FIGURES 1 and 2 are front and rear rollers 10, each mounted on a pin 11. An elongated tongue 12 of box-like construction is carried by rollers 10 for sliding movement within carriage 9. As indicated in FIGURE 1, spade-shaped lid-lifting means 13 are rigidly mounted on tongue 12 at one end thereof. Thus the only movement of lid-lifting means 13 is that imposed by tongue 12.

Associated with and operating on carriage 9 and tongue 12 are two rectilinear motors 14 and 15, which, in the preferred form of the invention, take the form of pneumatic cylinders. Together, these cylinders produce the movement needed to bring tongue 12 and therefore lid-lifting means 13 into contact with the lid 16 of journal box 17, which is mounted in conventional fashion outwardly of the wheel 18 of a railway car. By suitably combining a force component making for forward movement, imposed by cylinder 14, with a force component making for upward movement, imposed by cylinder 15, tongue 12 can be caused to lift lid 16 into the upright position indicated in FIGURE 1 at 16', this even though the car on which the journal box is mounted may be moving past the lid-lifting machine at moderate speed.

Tongue 12, which if desired may be solid rather than hollow in construction, is preferably of steel or other suitable material. It is jacketed on its top and sides by appropriately shaped strips of a fabric-reinforced impact-resistant synthetic resin of the thermosetting type: these strips are provided to minimize friction between carriage 9 and tongue 12, which have considerable relative movement. Top strip 21 and side strips 22 can best be seen in FIGURE 10. From FIGURE 11 it will be noted that carriage 9 is made up of a top piece 23 and side pieces 24. Like tongue 12, it may be of steel or other suitable material.

Figure 12:
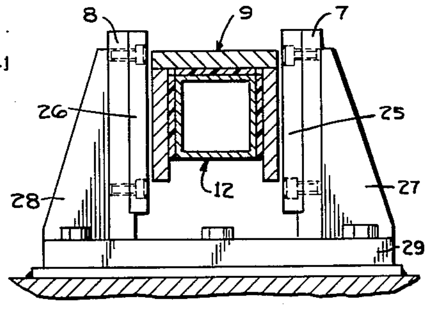
FIGURE 12 is a section on line 12—12 of FIGURE 2.

From FIGURE 12 it will further be noted that the cradle made up of side plates 7 and 8 is provided with wear pads 25 and 26. Preferably of bronze, such wear pads are for the purpose of minimizing friction between side plates 7 and 8 and side pieces 24 of carriage 9. Side plates 7 and 8 are backed by webs 27 and 28, respectively. They are supported on a common bed plate 29. The cradle so formed serves the function of guiding carriage 9 in its reciprocatory movement over the center line of the machine.

Immediately to the left of the guide cradle, seen as in FIGURES 1 to 3, are the previously mentioned minor side pieces 5 and 6, from which carriage 9 is supported in the manner illustrated in FIGURE 11. As there shown, the supporting structure includes a double crank made up, among other things, of two crank pins 31 and 32, two spacers 33 and 34 attached to side pieces 24 of carriage 9, and two crank arms 35 and 36 fastened by pins 37 and 38 to a common crank shaft 39. The latter is mounted in suitable fashion in bearing blocks 41 and 42 at the tops of minor side pieces 5 and 6, respectively. Connecting minor side pieces 5 and 6 is a cross head 43 that is rigidly attached to bearing blocks 41 and 42.

Cylinder 14, which as indicated in dotted lines in FIGURE 11 occupies a considerable part of the open space between crank arms 35 and 36, is provided with lines 44 and 45 for supplying and withdrawing air or other fluid. These lines are connected to pneumatic and electrical control systems later to be described. At its right-hand end, seen as in FIGURES 1 to 3, cylinder 14 is mounted by means of a coupling pin 46 on a bracket 47 attached to top piece 21 of carriage 9. From the left-hand end of the cylinder projects piston rod 48, which at its outer end is supported from a coupling pin 49 on a bracket 50 attached to the outboard end of tongue 12: see FIGURE 2.

As will be apparent from what has already been said, supplying air to cylinder 14 through line 44 and withdrawing it through line 45 will serve to move from left to right the position (not shown) within the cylinder. If, for the sake of simplicity, carriage 9 is assumed to be stationary, this movement of the piston will bring about corresponding movement of piston rod 48, bracket 50 and tongue 12. The latter, being supported for sliding movement on rollers 10, will move from left to right within the carriage. Thus the lid-lifting means 13 at the inboard or forward end of tongue 12 will be moved out of the position shown in FIGURE 2 into a position more nearly corresponding to that indicated in FIGURE 1 by dotted lines 13'. In this way lid-lifting means 16 are brought into preliminary position below journal box 17.

Figure 13:
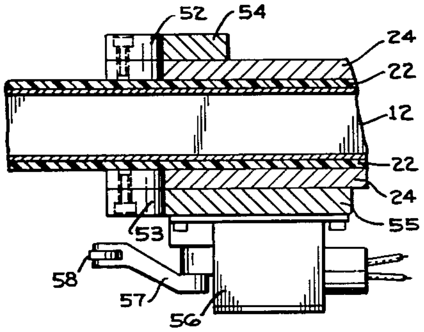
FIGURE 13 is a section on line 13—13 of FIGURE 2.
Figure 14:
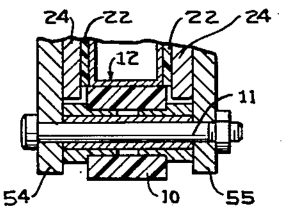
FIGURE 14 is a section on line 14—14 of FIGURE 2.

As shown in FIGURES 1 and 2, tongue 12 is provided with means of the nature of a stop for limiting its forward movement with carriage 9, such means taking the form of a double-ended metal pin 51. The latter is adapted to enter into two slots 52 and 53 at the outboard or rear end of carriage 9: see FIGURE 13. Mounted on the end of carriage 9 are a short plate 54 and a long plate 55, which, like carriage 9 itself, are cut away to form slots 52 and 53. As appears from FIGURE 13, long plate 55 carries an electric switch 56 provided with an actuating arm 57 and roller 58 appropriately positioned for engagement by a finger 59 rigidly supported on bracket 50: see FIGURES 1 to 3. When finger 59 engages roller 58 on arm 57, switch 56 is actuated, thereby cutting off the supply of air to line 44. By the time this comes about, lid-lifting means 13 on tongue 12 will have been moved into lifting engagement with lid 16 in the manner hereinafter explained.

Figures 6, 7, 8, 9:
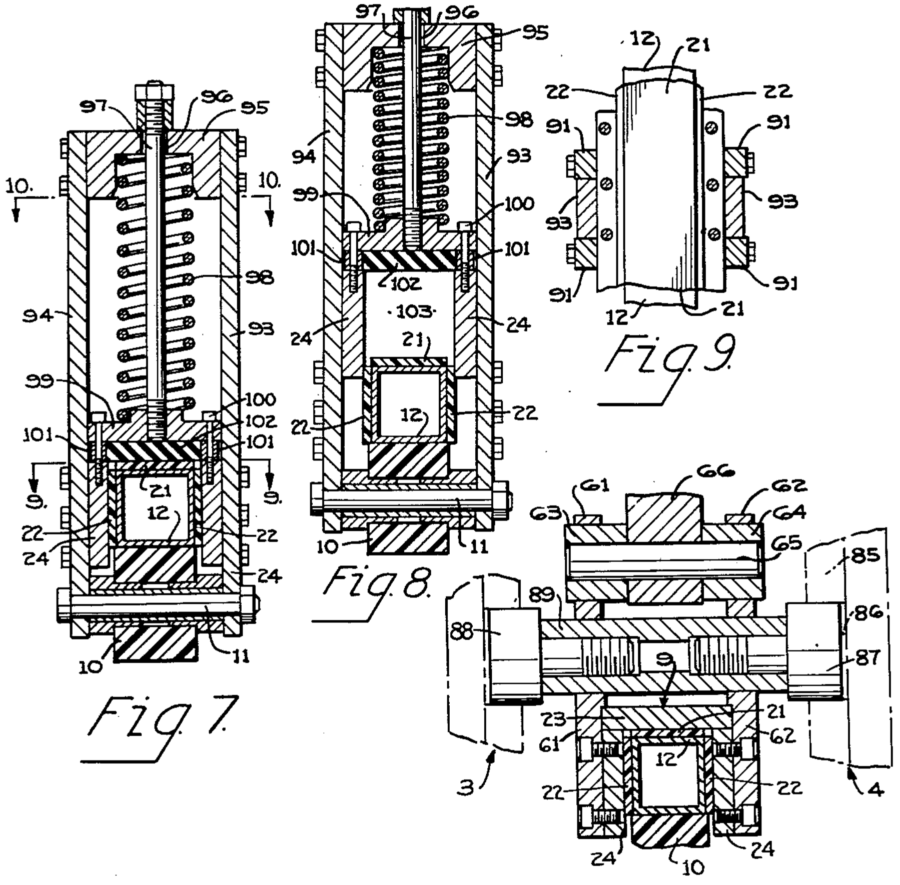
FIGURE 6 is a section with parts in elevation on line 6—6 of FIGURE 2.
FIGURE 7 is a section on line 7—7 of FIGURE 2.
FIGURE 8 is a similar section showing certain of the parts in a different position.
FIGURE 9 is a section on line 9—9 of FIGURE 7.

Toward the forward end of carriage 9 are mounted two supporting plates 61 and 62, seen in cross section in FIGURE 6. At their upper ends, supporting plates 61 and 62 carry two rigidly mounted sleeves 63 and 64 which in turn carry the two ends of a pivot pin 65. The latter extends outwardly from the sides of a fitting 66 on the lower end of a piston rod 67 that projects downward from cylinder 15. As indicated in FIGURE 2, cylinder 15 is provided with lines 68 and 69 for the supply and withdrawal of air or other fluid.

Cylinder 15 is suspended from a pivot pin 70 on a downwardly directed bracket 71 forming part of a cross head 72 connecting the upper ends of two vertical uprights 73. These uprights are bolted to the inside faces of major side pieces 3 and 4: see FIGURES 2 and 5. Cross head 72 is given additional support by diagonal braces 74, which extend upwardly from the forward ends of major side pieces 3 and 4. Thus cylinder 15 is so positioned as to enable it to swing the forward end of carriage 9 upward about an axis coinciding with the center lines of crank pins 31 and 32. A comparison of FIGURES 1 and 2 will show how this is accomplished.

Figure 19:
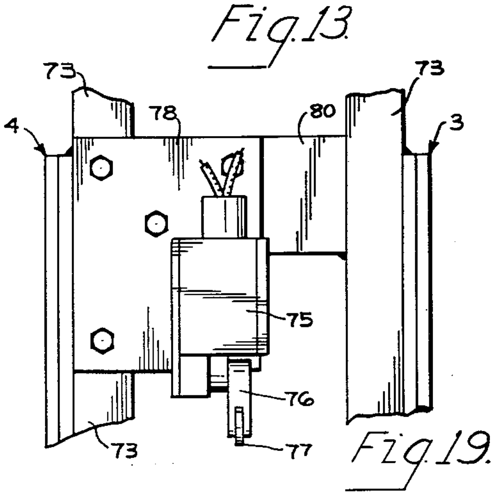
FIGURE 19 is an elevation from line 19—19 of FIGURE 2.

When carriage 9 is in the elevated position shown in solid lines in FIGURE 1, by which time lid 16 on journal box 17 is in partially open position, a switch 75 located as shown in FIGURES 1, 2 and 19 is operated to cut off the supply of air to line 68. To this end, switch 75 is provided with an actuating arm 76 having at its outer end a roller 77. It is mounted on a plate 78 supported in part on one of uprights 73 and in part on a stiffening channel 80 extending transversely of major side pieces 3 and 4. As indicated in FIGURES 1 and 2, carriage 9 carries a suitably located abutment 79 which, when carriage 9 is in elevated position, engages roller 77 on actuating arm 76. If desired, switch 75 and abutment 79 may be located elsewhere in the machine.

Figure 4:
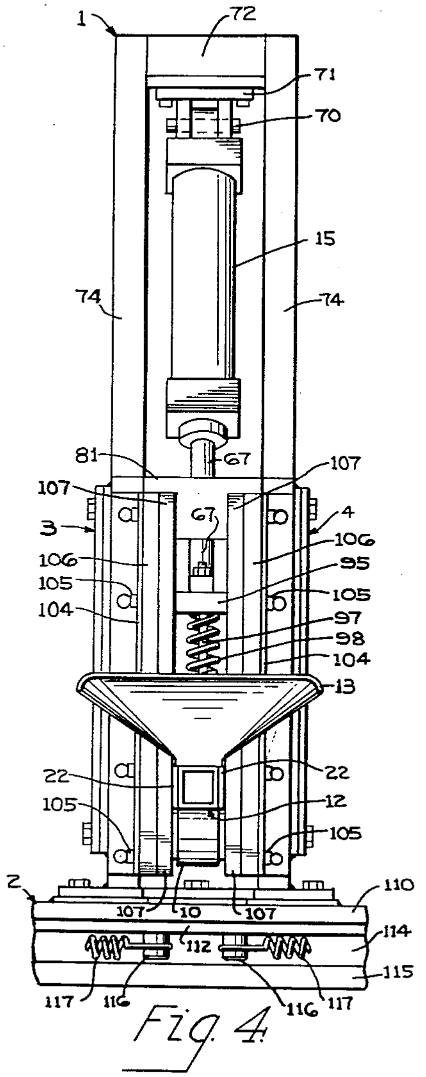
FIGURE 4 is an end elevation on a somewhat larger scale, seen from the right in FIGURES 2 and 3.
Figure 5:
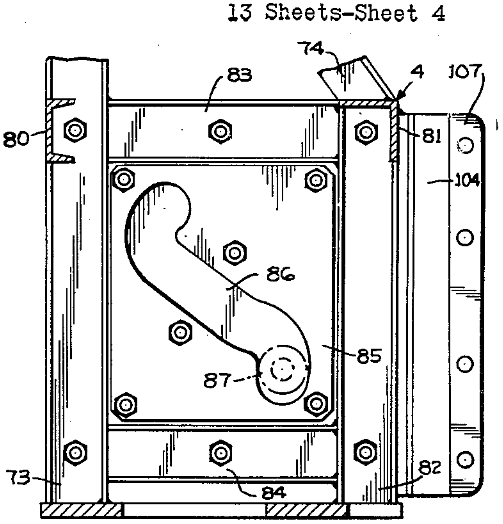
FIGURE 5 is an elevation of the inside face of one of the two major side pieces: see line 5—5 of FIGURE 3.

Referring now to FIGURES 4 and 5, particularly the latter, it will be noted that major side pieces 3 and 4 support not only uprights 73, which extend from the base of the machine to the cross head 72, but also two shorter uprights 82 at the forward ends of side pieces 3 and 4. Interconnecting the side pieces is channel 80, which is set into and welded in place in uprights 73, and an angle iron 81 set into and welded into place at the upper ends of uprights 82. The two side pieces are of opposite hand but formed as illustrated (in the case of side piece 4) in FIGURE 5. Forming part thereof are channels 83 and 84 and, between them, a rectangular plate 85. Like the corresponding plate on side piece 3, plate 85 is provided with a generally S-shaped cam slot 86. The two cam slots determine the path described by the forward end of carriage 9.

The manner in which this result is accomplished will be apparent from the sub-assembly shown in FIGURE 6. As already noted, sleeves 63 and 64 are rigidly attached to the upper ends of supporting plates 61 and 62. Between sleeves 63 and 64 on one hand and, on the other, side pieces 24 of carriage 9, supporting plates 61 and 62 carry a transverse sleeve 89 that is welded in place to preclude rotation. In the ends of this sleeve are received the shanks of two roller assemblies 87 and 88. The outer ends of these roller assemblies fit between the side walls of the two cam slots. Thus the cam slots are determinative of the movement of the carriage.

At any point along the length of the carriage, this movement has both vertical and horizontal components. At the forward end of the carriage the resultant corresponds generally to the path 19 indicated in dotted lines in FIGURE 1. This path is the theoretical, but not necessarily the actual path, of the forward end of tongue 12. That it is characterized in part by retrogression is apparent from its shape. Retrogressive movement of tongue 12 is feasible as a result of the fact that the resistance to such movement interposed by cylinder 14 is only the yielding resistance presented by a cushion of air under pressure.

If all journal boxes were located in the same relation to wheel 18 and if all journal boxes presented the same outline, seen as in FIGURE 1, the path represented by dotted line 19 in FIGURE 1 could be made to conform to the outline of a typical journal box. However, because of differences in shape between journal boxes of one make and journal boxes of another make, it is desirable to organize the elements of the lid-lifting machine in such manner that lid-lifting means 13 at the forward end of tongue 12 will engage and follow the outside surface of the journal box even when theoretical path 19 is inward of such outer surface; i.e., even when it intersects the outline of the journal box as in FIGURE 1. To bring this about it is desirable that there be freedom for parting movement as between carriage 9 and tongue 12.

The nature and extent of this parting movement will be apparent from a comparison of FIGURES 7 and 8, which show the details of a sub-assembly located between major side pieces 3 and 4 immediately forward of plates 61 and 62. This sub-assembly is characterized, among other things, by a first pair of guides 91 rigidly mounted on the near side of carriage 9, seen as in FIGURE 2, and a second pair of guides 92 similarly mounted on the opposite side of carriage 9. A loosely supported upright 93 intervenes between guides 91; similarly, a like upright 94 intervenes between guides 92. At their lower ends, uprights 93 and 94 carry the pin 11 from which forward roller 10 is supported.

At their upper ends, uprights 93 and 94 are connected by a cross piece 95 provided with a central opening 96 for the reception of a vertical rod 97 capped in any suitable fashion, as by a nut. The upper end of coil spring 98, which surrounds rod 97, bears against cross piece 95; the lower end, against a plate 99 held by cap screws 100 to the side pieces 24 of carriage 9. Plate 99 is separated from side pieces 24 by spacers 101 which replace top piece 23 of carriage 9 in the immediate vicinity of uprights 93 and 94. Spacers 101 allow for the introduction in this area of a resilient bumper 102 of rubber or rubber-like material attached to the lower face of plate 99. Plate 99 has a tapped opening for the threaded lower end of rod 97: see FIGURE 8.

In these circumstances, when lid-lifting means 13 at the forward end of tongue 12 are moved as contemplated by FIGURE 1 from the lower dotted line position (indicated at 12′ and 13′) into a typical intermediate position (indicated at 12″ and 13″); i.e., into engagement with the bulged outer portion of journal box 17, the forward end of carriage 9 is able to follow a path paralleling the theoretical path represented by dotted line 19. Being free to move upward against the relatively light resistance of spring 98, carriage 9 assumes the position shown in FIGURE 8, developing a central void 103 in the space between uprights 93 and 94. Tongue 12, yieldingly opposed by cylinder 14, follows the bulged outer portion of the journal box. Ultimately, in response to the lifting action of cylinder 15, tongue 12 and lid-lifting means 13 are brought into contact with the outer edge of lid 16, moving it into upright position.

Figure 10:
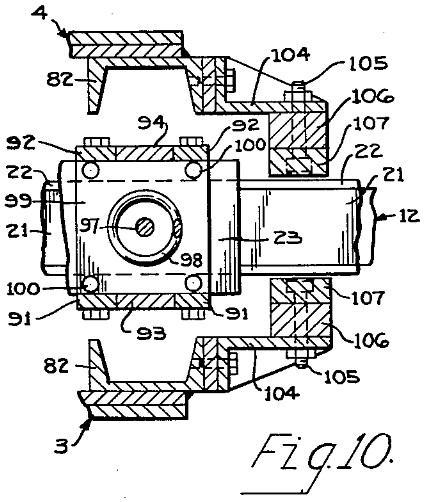
FIGURE 10 is a section on line 10—10 of FIGURE 7.

Referring now to FIGURES 4 and 10, it will be noted that vertically standing angle irons 104 are mounted on uprights 82 at the forward ends of major side pieces 3 and 4. On the inside faces of angle irons 104, by means of bolts 105, are mounted spacing strips 106 and guide strips 107, both of metal. In this area, which is forward of the proximate end of carriage 9, the jacketed sides of tongue 12 come into engagement with guide strips 107. The latter extend the full height of side pieces 3 and 4, thus acting on tongue 12 throughout its cycle of movement out of and into idle position. The idle position of tongue 12 is that shown in FIGURE 2 wherein carriage 9 makes only a shallow angle with the horizontal.

Figure 30:
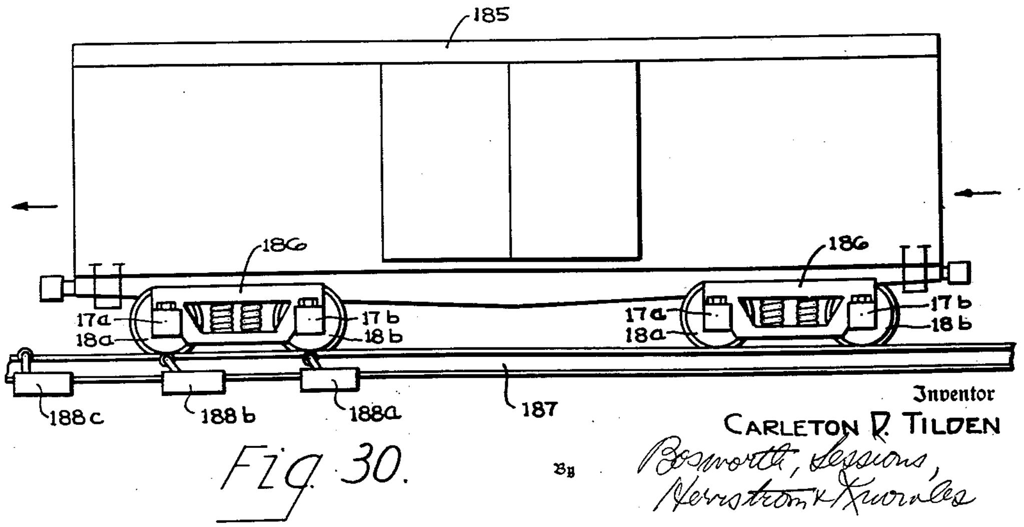
FIGURE 30 is a diagrammatic representation of a freight car in engagement with two of a series of three track switches.

Subject to limitations imposed by the shape of cam slot 86 in side piece 4 and the correponding cam slot in side piece 3, the pistons in cylinders 14 and 15 thus impart the required movement to carriage 9 and tongue 12. Cylinder 14 serves the purpose of moving tongue 12 forward and backward; cylinder 15, that of lifting the forward end of carriage 9. In the course of such lifting movement, lid 16 is brought into its upright position (16′) which it maintains, thus permitting an oiler to give any needed attention to the interior of the journal box 17. Return of carriage 9 and tongue 12 to their idle positions, which return is aided by the action of gravity, is initiated by cut-off switches 56 and 75. In general, however, actuation and/or deactuation of the circuitry by which cylinders 14 and 15 are controlled requires engagement by an approaching railway car of one or more track switches (FIGURE 30).

Mention has been made of the fact that not all journal boxes are alike; similarly, railroad cars differ in the details of their construction, as, for example, in the position of steps used by passengers and the location of ladders used by trainmen. Steps, ladders and the like may at times be in the way of tongue 12 and lid-lifting means 13; accordingly, to take care of these situations it is desirable to be able to swing tongue 12 out of the normal position shown in full lines in FIGURE 3 into the position shown therein in dotted lines, following the path indicated by the arrow. This can be done by incorporating in the base 2 of the lid-lifting machine a turntable constructed as shown in FIGURE 2.

As appears from the latter figure, base 2 of the lid-lifting machine incorporates a center pin 109 about which turntable 110 can rotate. To facilitate its rotation, turntable 110 is provided on its lower face with bronze wear strips 111: see FIGURES 2 and 3. It is further provided on its lower face with an annular sealing ring 112 adapted to engage an annular gasket 113 suitably positioned in an underlying stationary table 114. The latter is fixed in relation to bed plate 115, which in turn is in contact with the foundation of the machine.

At the forward end thereof, turntable 110 is provided with two downwardly directed lugs 116 to which are attached the ends of two long coil springs 117 that wrap around stationary table 114. The relationship between turntable 110, stationary table 114, lugs 116 and springs 117 is indicated in FIGURE 4. Referring to FIGURE 3, it will be noted that springs 117 follow the contour of stationary table 114 over an included angle somewhat in excess of 180°, after which they become tangent to it. This results from the fact that their outboard ends are attached to studs 118 on threaded eyes 119 that are held rigidly in place in lugs 120 on a mounting plate 121. In order to bring it within FIGURE 3, mounting plate 121 is shown as directly below the outboard end of tongue 12; however, in practice it is offset to the left, seen as in FIGURE 3.

Figure 15:
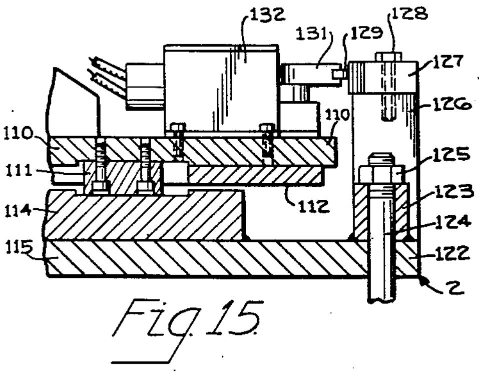
FIGURE 15 is a section with parts in elevation on line 15—15 of FIGURE 3.

Bed plate 115 is provided at suitable intervals with extensions 122 (FIGURES 3 and 15) on which are mounted drilled bosses 123. Within bosses 123 are received bolts 124 by which, with the aid of nuts 125, bed plate 115 is held in position on the foundation underlying the lid-lifting machine. One of the extensions 122 on bed plate 115 is further provided with an upstanding lug 126 surrounded by a striker plate 127 that is held in place by a cap screw 128: see FIGURE 15. When the turntable is in its normal position, striker plate 127 is in engagement with a roller 129 attached to an actuating arm 131 on a table switch 132 mounted on turntable 110.

Switch 132 is a master switch that cuts off other controls in the event that turntable 110 is rotated out of its usual position. Engagement of lid-lifting means 13 by the steps or ladder of a railway car will initiate such rotation, thus bringing about almost immediate operation of switch 132 and attendant neutralization of the controls with the aid of which lid-lifting movement is imparted to carriage 9, tongue 12 and lid-lifting means to 13. By the time turntable 110 has been rotated sufficiently to bring tongue 12 and lid-lifting means 13 into the position shown in dotted lines in FIGURE 3, its rotation is terminated by abutments (not shown) on one or the other or both of turntable 110 and stationary table 114. Springs 117 then return turntable 110 to its original position.

Figure 17:
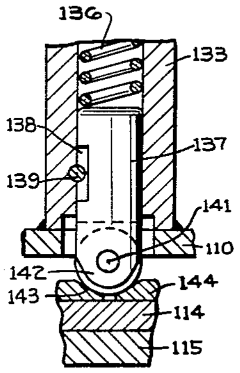
FIGURE 17 is a fragmentary section on line 17—17 of FIGURE 16.
Figure 16:
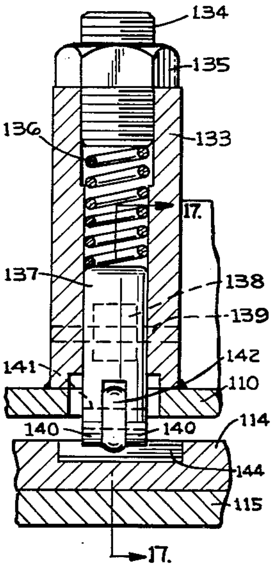
FIGURE 16 is a section with parts in elevation on line 16—16 of FIGURE 3.

In order to maintain turntable 110 in its normal position; namely, the position shown in full lines in FIGURE 3, it is provided with detent means formed as shown in FIGURES 16 and 17. It will be noted that such detent means include a sleeve 133 one end of which is welded to the upper face of turntable 110. In the open upper end of sleeve 133, which is tapped, is a threaded plug 134 that is held against movement by a nut 135. Engaging the lower end of plug 134 is a coil spring 136. The opposite end of spring 136 bears against a plunger 137 provided with a cut-away portion 138. Within such cut-away portion is received a fixed retaining pin 139: see FIGURE 17.

At its lower end, plunger 137 is slotted so as to form two ears 140 for a pin 141 provided with a roller 142. Ears 140 and roller 142 project below the lower face of turntable 10, extending downward into engagement with stationary table 114. The latter is provided with a grooved insert 144, formed as shown in FIGURE 17, which receives roller 142. The detent means so provided hold turntable 110 in place in the absence of a substantial turning force such as would result from engagement of lid-lifting means 13 by the steps or ladder of a moving railway car. When such engagement comes about, the detent means yield, enabling roller 142 to ride on the upper face of stationary table 114. As a result, turntable 110 can rotate into a position such as that represented in FIGURE 3 by the dotted line showing of tongue 12 and lid-lifting means 13.

Figures 37, 38:
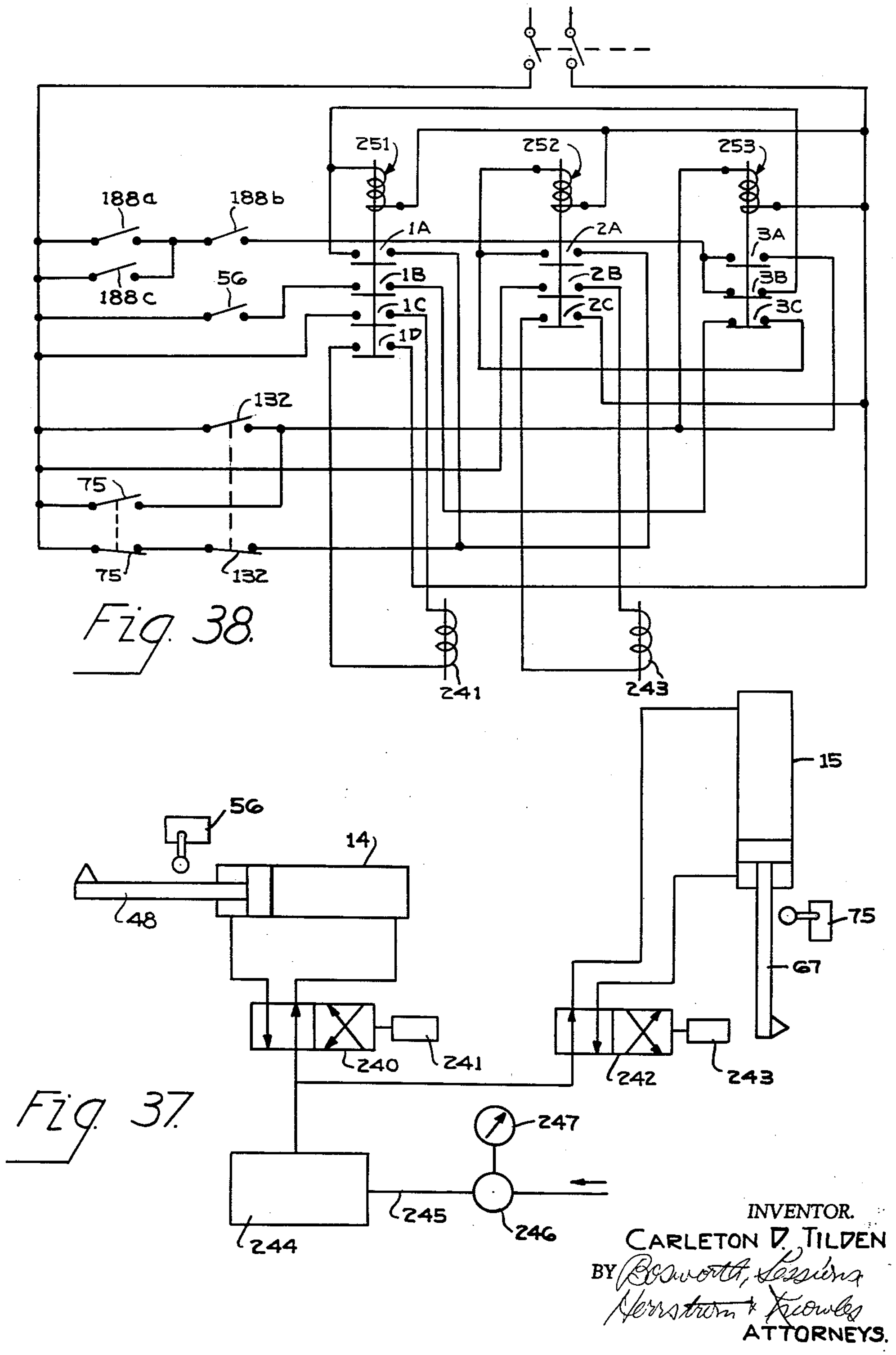
FIGURE 37 is a schematic representation of a typical pneumatic circuit for the lid-lifting machine of FIGS. 1 to 19, incl.
FIGURE 38 is a schematic representation of a typical electrical circuit for the lid-lifting machine of FIGS. 1 to 19, incl.

Suitable pneumatic and electrical circuits for use in a lid-lifting machine of the kind just described are illustrated in FIGURES 37 and 38, respectively.

So far, the description of the invention has dealt mainly with the embodiment illustrated in FIGURES 1 to 19, inclusive. For the purposes of the invention, it is not necessary to employ cam slots and a cam follower formed as shown in FIGURES 5 and 6; instead, it is equally possible to employ a four-bar linkage of the kind illustrated in FIGURE 20. From the latter figure it will be noted that piston rod 67 can be attached to a bracket 145 on carriage 9 and that three movable links 146, 147 and 148 can be connected as shown between carriage 9 and a transverse rod 149 that extends between main side pieces 3 and 4. With a four-bar linkage of this kind, substantially the same movement of the carriage can be obtained without using the camming system of the previously described embodiment of the invention.

Another modification, shown in FIGURES 21 to 29, inclusive, omits the carriage entirely and imposes the desired movement by means of an electric motor directly on the tongue and lid-lifting means. As appears from FIGURES 21 to 29, an electric motor 150 with a projecting drive shaft 151 is used to drive a pinion 152 in meshing engagement with a large gear 153. Gear 153 in turn drives the housing of a conventional air-actuated pneumatic clutch 154. Interiorly of the clutch is a stepped sleeve 155 the lower end of which is fixedly attached to a shaft 156 that extends through the clutch into a bearing block 157: see FIGURE 21. Bearing block 157 is rigidly mounted on an upright 158 forming part of a framework used to support the mechanism as a whole.

Figures 20, 21:
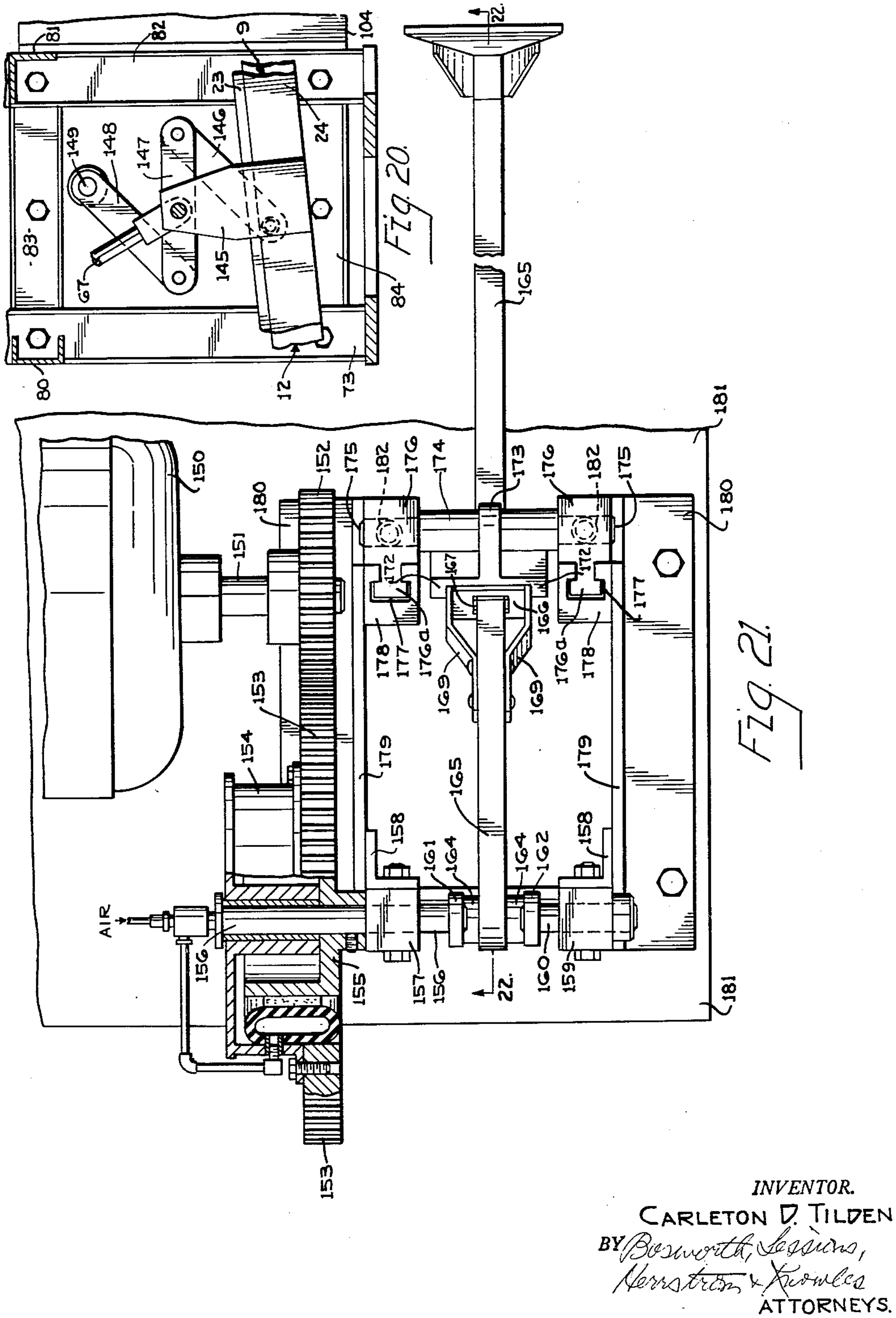
FIGURE 20 is an elevation similar to that of FIGURE 5 illustrating a modification.
FIGURE 21 is a top plan of still another modification.
Figures 22, 23, 24, 25:
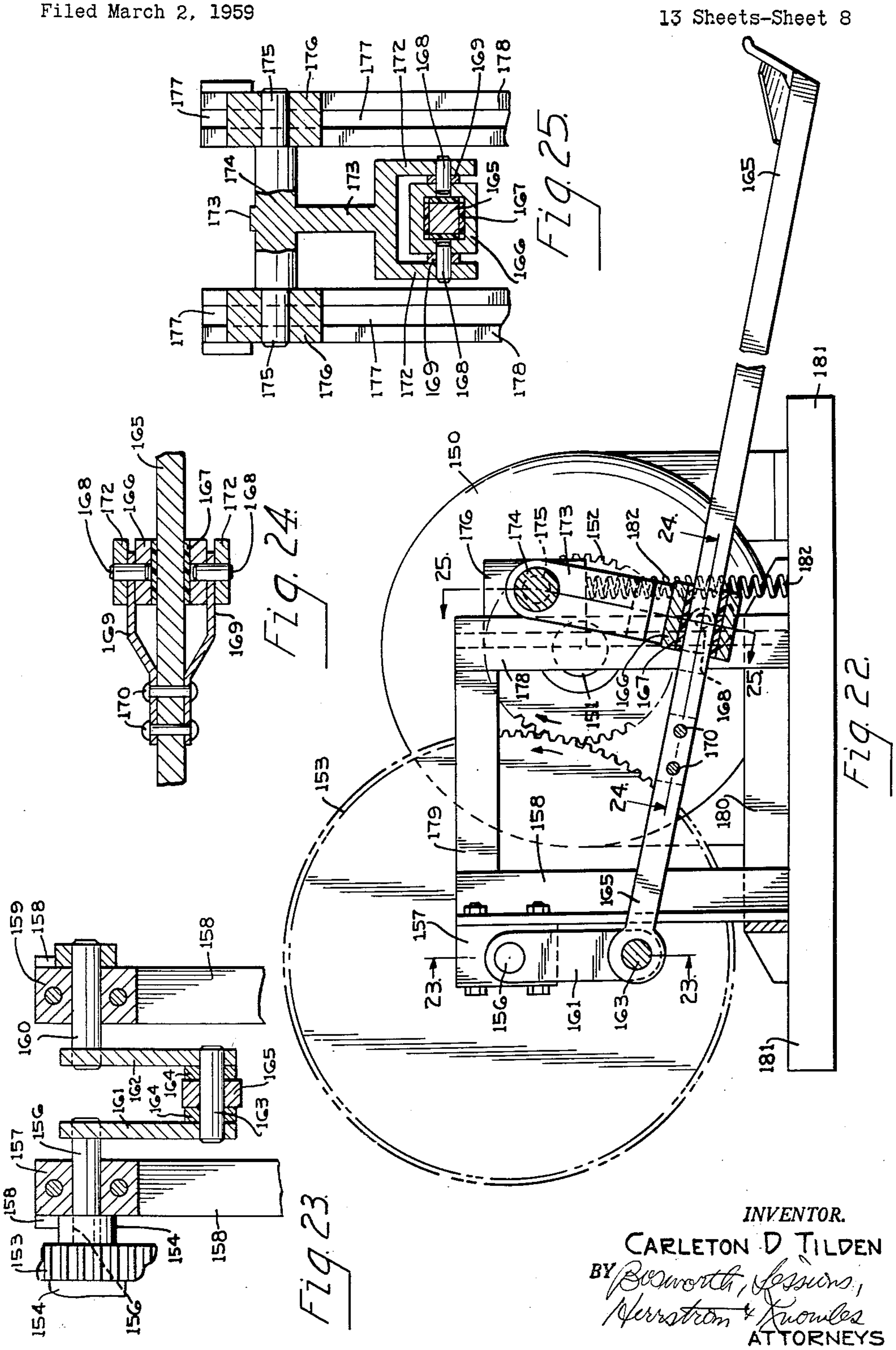
FIGURE 22 is a side elevation corresponding to FIGURE 21.
FIGURE 23 is a section on line 23—23 of FIGURE 22.
FIGURE 24 is a section on line 24—24 of FIGURE 22.
FIGURE 25 is a section on line 25—25 of FIGURE 22.
Figures 26, 27:
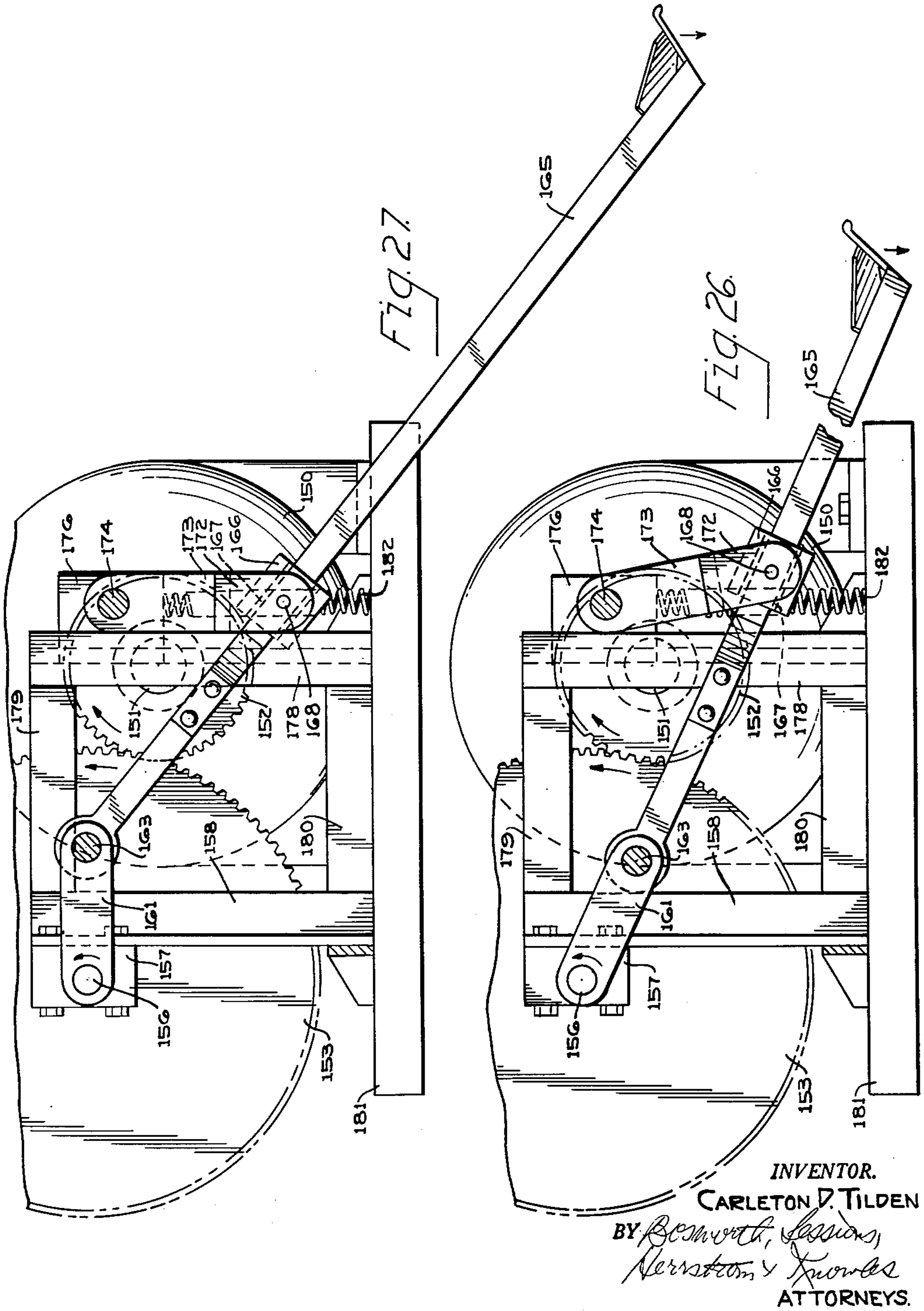
FIGURES 26 to 29 are side elevations similar to that of FIGURE 22 but with the parts in other positions.

Referring now to FIGURE 23, it will be noted that bearing block 157 is mounted in spaced relation to a similar bearing block 159 carrying a stub shaft 160. Depending from the projecting outer ends of shafts 156 and 160 are two arms 161 and 162 which, together with crank pin 163, make up a double crank construction. Mounted on crank pin 163 are two spacers 164 and a tongue 165 that corresponds to tongue 12 of the previously described embodiments of the invention. In FIGURES 21 to 23, these parts and the parts associated with them are shown in their idle position, in which arms 161 and 162 extend downwardly in 6 o'clock position relative to shafts 156 and 160: see FIGURE 22.

Approximately midway of its length tongue 165 is supported by an open-ended box-like element 166 which, where lining 167 appears in FIGURES 22, 24 and 25, can be lined with synthetic resin padding material. Box-like element 166 supports two pivot-like pins 168 on which are mounted two rearwardly extending metal straps 169 the remote ends of which are riveted at 170 to tongue 165: see FIGURE 24. The outer ends of pivot pins 168 are supported in the two arms 172 of a downwardly extending yoke 173. The latter is formed integrally with a shaft 174 provided with reduced ends 175 for reception in the manner shown in FIGURE 25 within suitably formed openings in two slidable blocks 176.

Blocks 176 are provided on their rear faces with T-shaped extensions 176*a* (FIGURE 21) that fit into T-shaped slots 177 in two uprights 178 forming part of the framework. Uprights 178 are connected to uprights 158 by upper cross pieces 179 and lower cross pieces 180. The latter are rigidly affixed to a base 181 rigidly mounted some distance above the ground on a suitable platform (not shown). Intervening between blocks 176 and base 181 are two coil springs 182 the opposite ends of which are received in suitable spring seats (not shown). Blocks 176, which function after the fashion of slides, are biased by springs 182 toward positions near the upper ends of slots 177 as indicated in FIGURES 26 to 29, inclusive.

As already noted, the parts are shown in FIGURE 22 in their idle or normal position. This position obtains until such time as the control system operates to energize motor 150 and admit air to the bellows forming part of the pneumatic clutch shown in FIGURE 21. When the latter happens, sleeve 155 and shaft 156 turn counterclockwise, moving crank arms 161 and 162 into a series of positions more or less like that shown in FIGURE 26, in which arms 161 and 162 are in four o'clock position. As a result, the free end of tongue 165 is progressively moved forward and downward. Continuing counterclockwise movement of sleeve 155 and shaft 156 brings crank arms 161 and 162 into the three o'clock position shown in FIGURE 27. By this time the free end of tongue 165 has moved still farther in the downward direction. In this sequence of steps, tongue 165 is readying itself for a subsequent upswing in the course of which its free end will come into engagement with the journal box.

Figures 28, 29:
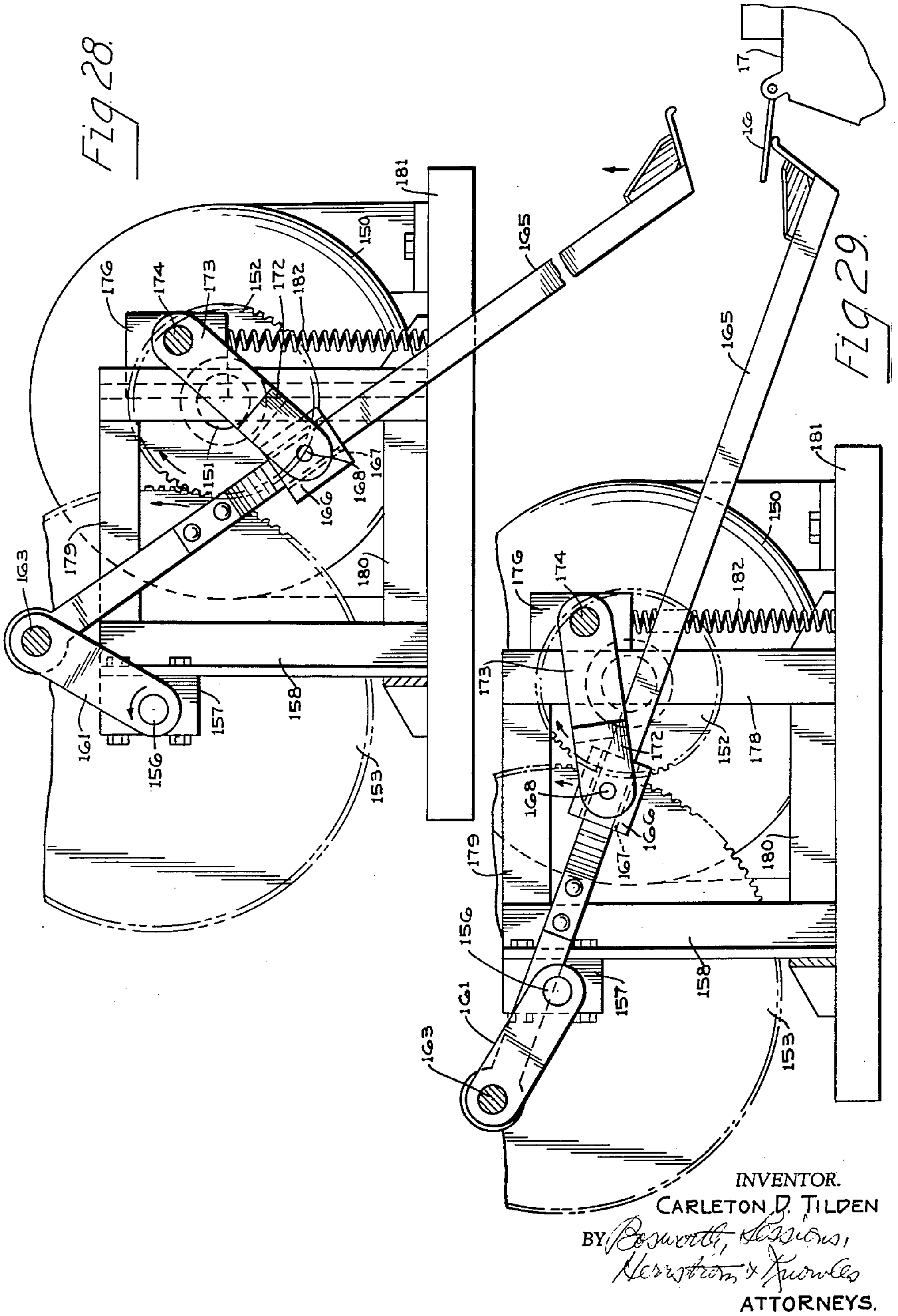

The early stages of the upswing are illustrated in FIGURE 28, in which crank arms 161 and 162 are in one o'clock position as a result of further counterclockwise movement of sleeve 155 and shaft 156. Continued rotation brings about a continuation of the upswing. In this sequence, the free end of tongue 165 moves forward and upward into engagement with journal box 17. This phase is represented by FIGURE 29, in which crank arms 161 and 162 are in ten o'clock position. Further rotation of sleeve 155 and shaft 156 completes the operation of lifting the lid 16 on journal box 17 into upright position, whereupon the control system operates to de-clutch shaft 156, crank arms 161 and 162, and the various other elements associated with tongue 165. Tongue 165 then returns to the idle position shown in FIGURE 22.

Under some conditions, a given journal box may offer excessive resistance to the lid-lifting means at the forward end of tongue 165. In such circumstances, in order to prevent jamming and breakage of the mechanism, blocks 176 are enabled to slide downward on uprights 178, thereby compressing coil springs 182. This movement, the nature of which will be apparent from FIGURES 22 and 25, enables tongues 165 to yield sufficiently to prevent damage to the lid-lifting machine as a whole. In a broad sense, the action is analogous to the parting action illustrated in FIGURES 7 and 8 in connection with the first-described embodiment of the invention.

Referring now to FIGURE 30, what is there shown is a moving freight car 185 provided with standard trucks 186 with each of which is associated a first journal box **17*a* and first wheel 18*a* and a second journal box 17*b* and second wheel 18*b*. Three track switches 188*a*, 188*b* and 188*c* appear, two of which are shown as in contact with overlying wheels. Upon first approach of the car and engagement of wheel 18*a* with track switch 188*a*, nothing happens; but when the car moves into the position shown in FIGURE 30, in which both wheels 18*a* and 18*b* make contact with track switches 188*a* and 188*b*, a circuit similar to that shown in FIGURE 38 is closed, thereby bringing the lid-lifting machine (not shown) into operation. The machine is preferably located abreast of track switches 188*b* and 188*c* so that by the time car 185 moves to the left of the position shown in FIGURE 30 the lid-lifting machine operates to bring the lid-engaging means into contact with journal box 17*a***.

As car 185 continues to move to the left, wheels **18*a* and 18*b* come into contact with track switches 188*c* and 188*b*, respectively, thereby again closing the circuit. By the time journal box 17*b* is abreast of the lid-lifting machine, the latter is operated a second time to bring the lid-engaging means thereof into contact with journal box 17*b***.

Thus by the time wheel **18*a* has moved to the left of track switch 188*c*, seen as in FIGURE 30, journal boxes 17*a* and 17*b*** will both have been opened as indicated in dotted lines in FIGURE 1.

Normally there will be two lid-lifting machines, one on each side of tracks 187, so that the lids on two journal boxes on opposite ends of a given axle will be opened at the same time. To accomplish this, it is not necessary that there be two series of track switches, for a single series of switches **188*a*, 188*b* and 188*c*, properly connected, is sufficient to operate both lid-lifting machines. If desired, however, there may be two series of track switches, one on the near side of tracks 187** and one on the far side, each connected to its own lid-lifting machine.

The spacing between track switches **188*a*, 188*b* and 188*c* is important at least in the sense that the distance between two adjacent switches should correspond to the longitudinal distance between axles in a standard railway car truck. Thus a standard freight car, if it comes upon track switches 188*a*, 188*b* and 188*c* in the manner indicated in FIGURE 30, can cycle each of two oppositely disposed lid-lifting machines not once but twice. On the other hand, if what is approaching is a locomotive or some other railway vehicle with a wheel spacing different from that of the standard railway car, track switches 188*a* and 188*b* or track switches 188*b* and 188*c*, as the case may be, will not close simultaneously but seriatim, thus precluding cycling. In normal circumstances, it is only when track switches 188*a* and 188*b* or track switches 188*b* and 188*c*** close simultaneously that the lid-lifting machines will operate, this being apparent from the typical electric circuit shown in schematic fashion in FIGURE 38.

Figure 31:
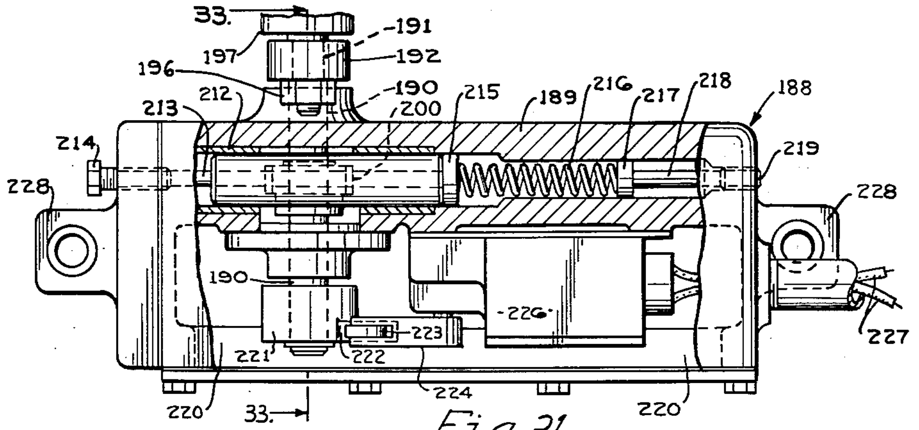
FIGURE 31 is a top plan with parts in section of one of the track switches.
Figures 32, 33:
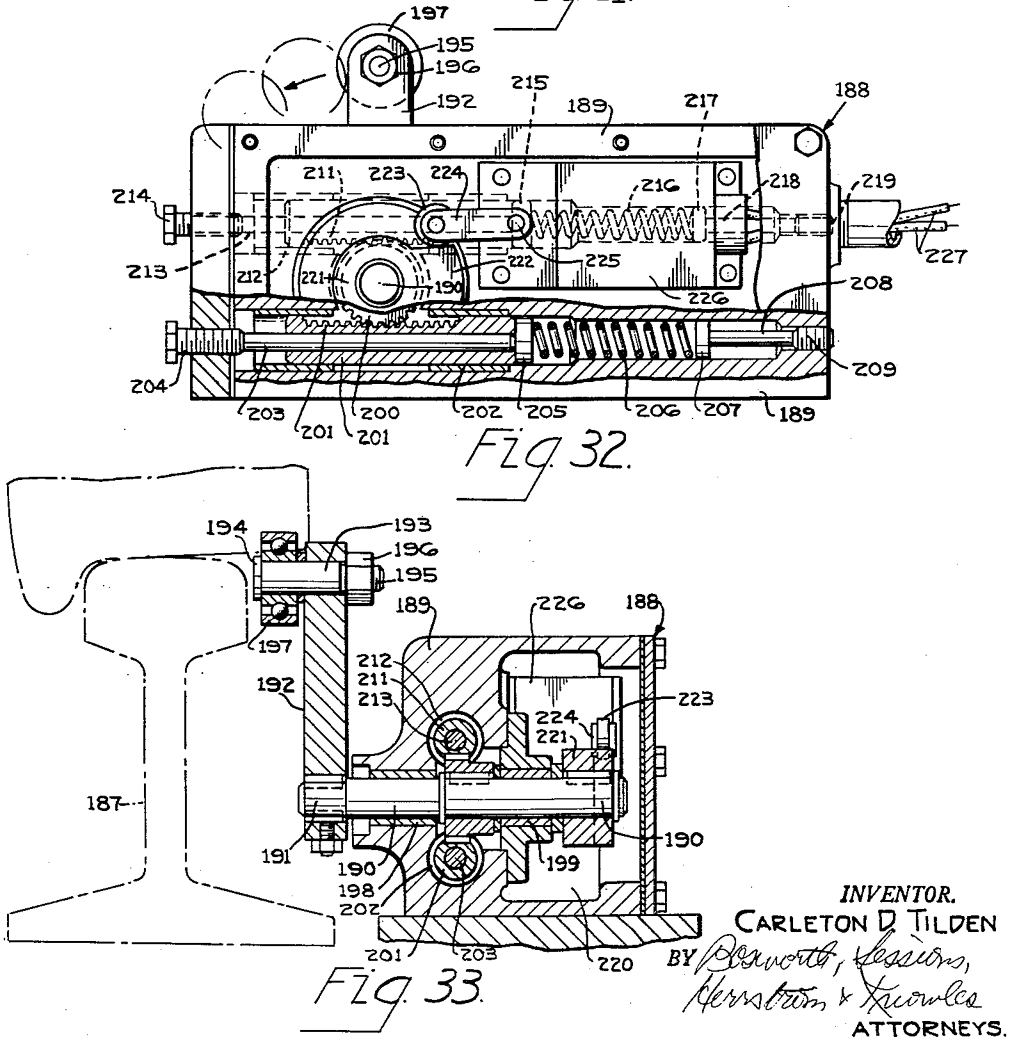
FIGURE 32 is a corresponding side elevation with parts in section.
FIGURE 33 is a section on line 33—33 of FIGURE 32.

For convenience, all three track switches shown in FIGURE 30 may be considered to be of the type illustrated in FIGURES 31, 32 and 33. For present purposes, it is sufficient to note that track switches of the type shown in FIGURES 31, 32 and 33 can be actuated only by a railway car approaching from the direction suggested by the arrows in FIGURE 30; i.e., from right to left, this because of the construction of the switches themselves. Thus a railway car approaching from the opposite direction; i.e., from the left to right, seen as in FIGURE 30, would not operate any of the three track switches and would be without effect on the two lid-lifting machines.

Referring now to the track switches shown in FIGURES 31 to 33, inclusive, it should be noted that the track switches generally are indicated by reference character 188. Within housing 189 of each is a tranversely extending shaft 190 the reduced outer end 191 of which projects through the side wall of the housing. On the reduced end 191 is adjustably mounted a rigid arm 192 which at its upper end carries a shaft 193 of the nature of a pivot pin. The latter is headed over as at 194 on the end adjoining tracks 187 and is provided at its opposite end 195 with a nut 196 for holding the parts in place. A joining headed end 194 is a roller 197 of the anti-friction type. When roller 197 is engaged by the wheel of a railway car, arm 192 is depressed and shaft 190 is rotated in the direction of travel of the car.

Shaft 190 is journaled as at 198 and 199 in housing 189. Rigidly keyed to shaft 190 is a pinion 200 adapted to coact with a generally cylindrical rack 201 slidably positioned in a cylindrical sleeve 202 that is cut away as shown in FIGURE 32 to accommodate the lower portion of the pinion. Rack 201 is provided with a central bore for an elongated rod 203 provided with an integrally formed adjusting head 204: see FIGURE 32. In contact with the inner end of rod 203 is a movable spring abutment 205. Bearing against it is a coil spring 206 the opposite end of which bears against a similar but smaller spring abutment 207 that is in contact with a shorter rod 208 provided at its outer end with an adjusting head 209. Like head 204 on rod 203, head 209 is accessible from the exterior of housing 189.

Opposing rack 201 on the opposite side of pinion 200 is a similar generally cylindrical rack 211 mounted in a cylindrical sleeve 212 that is similar in all respects to sleeve 202. Extending through a central bore in rack 211 is an elongated rod 213 the outer end of which is provided with an adjusting head 214; see FIGURE 32. At its opposite end, rack 211 is in contact with a movable spring abutment 215 engaged by a coil spring 216 similar to coil spring 206. The opposite end of coil spring 216 bears against a second spring abutment 217 in contact with a shorter rod 218 provided with an adjusting head 219. By means of this arrangement, spring 206 is opposed by spring 216, thus permitting arm 192 to seek and find a position in which it stands at right angles to the horizontal for movement from right to left in the arcuate path indicated by the arrow in FIGURE 32.

Within a hollow 220 in housing 189, the end of shaft 190 opposite reduced end 191 carries a cam 221 provided with a single lobe 222. When the track switch is in its idle position, lobe 222 extends substantially horizontally: see FIGURES 31 and 32. Overlying lobe 222 in the manner indicated in FIGURE 31 is a roller 223 supported from the outer end of a normally horizontally extending arm 224 the inner end of which is mounted on a spindle 225. The latter extends into the interior of a normally open switch 226 of conventional construction. The leads 227 form part of the switch circuit.

With this construction, the contacts in switch 226 are such that they can be closed only by clockwise movement of arm 224, as seen in FIGURE 32. When arm 192 is depressed by the oncoming wheel of a railway car, seen as in FIGURE 30, the impact of the wheel initiates counter-clockwise rotation not only of arm 192 but also of shaft 190, pinion 20, cam 221 and lobe 222. However, the latter swings roller 223 and arm 224 in the opposite or clockwise direction, thereby closing the contacts in switch 226.

As appears from FIGURES 31 and 32, track switch 188 is provided with hold down ears 228.

The type of track switch illustrated in FIGURES 31 to 33 can be actuated only by a railway car traveling from right to left, seen as in FIGURE 30. This is by no means a disadvantage, for frequently it is important that a railway car approaching from the wrong direction shall be without effect on the system of switches. A track switch of greater flexibility is illustrated in FIGURES 34 to 36. The type of switch there shown may be actuated by a railway car approaching from either direction, right or left, which sometimes is desirable.

In general, those parts that are designated by reference characters 189 to 191, 198 to 209 and 219 to 228 are the same as or similar to correspondingly numbered parts in the track switch of FIGURES 31 to 33, inclusive.

However, the track switch shown in FIGURES 34 to 36 is provided with a bell crank lever 230 supported from the reduced outer end of shaft 190. The headed portion 231 of lever 230 is rounded so as to enable it to coact with the wheel of a railway car approaching from either direction. Upper rack 232, which is of the plunger type, is opposed by a cylindrical rod 233 provided with an adjusting head 234. Between plunger 232 and the inner end of rod 233 is a shock-absorbing plug 235 of nylon. To permit of movement of rack 232, a space 236 is provided where indicated in FIGURE 34. From FIGURE 35 it will be evident that bell crank lever 230, shaft 190, pinion 200 and the two racks will always move in the same path, regardless of the direction of approach of the car.

Referring now to FIGURE 37, in which the pneumatic circuit is shown in schematic fashion, cylinders 14 and 15, piston rods 48 and 67 and switches 56 and 75 will be recognized as components identified by the same numbers in so much of the preceding portion of the specification as has to do with the first embodiment of the lid-lifting machine. It will be noted that cylinder 14 has associated with it a conventional four-way valve 240 operated by a solenoid 241 and that cylinder 15 likewise has associated with it a conventional four-way valve 242 operated by a solenoid 243. In each case the solenoid is provided with a return spring (not shown). Air or other gas under pressure is supplied by reservoir 244, which is connected to a suitable source by a line 245 incorporating a pressure regulator 246 provided with a gauge 247. The reservoir, pressure regulator and gauge are conventional.

When the wheels of a railway car traveling in the direction indicated by the arrows in FIGURE 28 operate track switches **188*a* and 188*b*, the cycle of the lid-lifting machine is initiated. The piston and piston rod in cylinder 14 move from left to right, seen as in FIGURE 37, in consequence of the admission of air under pressure to the space behind the piston, thus moving tongue 12 into position under journal box 17. This movement actuates switch 56, cutting off the supply of air to the space behind the piston in cylinder 14 and admitting air to the space behind the piston in cylinder 15**.

As a result, the piston and piston rod associated with cylinder 15 move upward, carrying with them carriage 9, tongue 12 and lid-lifting means 13. The tongue and lid-lifting means pass through a series of positions such as those indicated in dotted lines in FIGURE 1. Movement of carriage 9 actuates switch 75 as previously explained. This results in energization of solenoid 243, which operates on four-way valve 242 to cut off the supply of air to the space behind the piston in cylinder 15. The machine as a whole then returns to its idle position, seen in FIGURE 2, as a result of the admission of air to the space forward of the pistons in cylinders 14 and 15. In its idle position, it is in readiness for another cycle as soon as switches **188*b* and 188*c*** are closed by the wheels of the car.

A suitable electrical circuit for use with the lid-lifting machine shown in FIGURES 1 to 19 appears in FIGURE 38. Here the parts identified by numerals 56, 75, 132, **188*a*, 188*b*, 188*c*, 241 and 243 are those previously referred to by the same numerals in the preceding description of the lid-lifting machine. It will be noted that the electrical circuit includes three relays 251, 252 and 253** provided, respectively, with contacts 1A, 1B, 1C and 1D, with contacts 2A, 2B and 2C, and with contacts 3A, 3B and 3C.

When track switches **188*a* and 188*b* are closed, relay 251 is energized. Contacts 1A close, retaining the relay in the circuit. Contacts 1B, 1C and 1D close at the same time, thereby energizing solenoid 241, operating four-way valve 240, and causing air to be admitted behind the piston in cylinder 14. Forward movement of tongue 12, acting on switch 56, energizes relay 252**. Contacts 2*a* close, retaining the relay in the circuit. Contacts 2B and 2C close at the same time, energizing solenoid 243, operating four-way valve 242, and admitting air behind the piston in cylinder 15.

When tongue 12 reaches its uppermost position, switch 75, which is normally closed, is momentarily opened, breaking the circuits including relays 251 and 252. Thereupon contacts 1C and 2C open, de-energizing solenoids 241 and 243. Return springs associated therewith restore four-way valves 240 and 242 to their original positions. Thereupon, switch 75 closes, energizing relay 253, opening contacts 3B and 3C, and closing contacts 3A, thus assuring that recycling will not occur in the event that the railway car comes to a halt on switches **188*a* and 188*b* or switches 188*b* and 188*c*. When movement of the car allows switches 188*a* and 188*b* to open, the circuit including relay 253** is broken, opening contacts 3A and closing contacts 3B and 3C. The lid-lifting machine as a whole is now ready for recycling.

Further in connection with FIGURE 38, if tongue 12 encounters interference of a kind such as to cause the lid-lifting machine as a whole to be rotated, normally closed switch 132 will open the circuits to relays 251 and 252. This action will open all 1C and 2C contacts, thus returning tongue 12 to its idle position. When switch 132 closes, relay 253 is energized, maintaining unbroken the circuits to relays 251 and 252 until such time as both the lid-lifting mechanism and the car are in proper position for recycling.

It is evident that changes within the skill of those versed in the art may be made without departing from the spirit of the invention. In many instances, features may be added; in others, features may be omitted. In the case of the pneumatic and electrical circuits, extensive changes may be made by those familiar with circuits and circuitry. Where, as in the case of the pneumatic cylinders, the same or similar results may be achieved by the use of equivalents, substitution of the equivalent may be made without departing from the inventive concept.

It is intended that the patent shall cover, by summarization in the appended claims, all features of patentable novelty residing in the invention.

What is claimed is:

1. In apparatus for automatically lifting the lid of a railway car journal box, electrical switch gear for engagement by a wheel of the railway car; an electrical circuit of which the switch gear forms part; a fluid circuit coupled to the electrical circuit; motor means actuated through the medium of the circuitry by the switch gear; and a lid-lifting member coupled by connecting mechanism to the motor means for movement in a path bringing the lid-lifting member into contact with the journal box lid.

2. In apparatus for automatically lifting the lid of a railway car journal box, switch gear for engagement by the railway car; a turntable; supporting means on the turntable; a lid-lifting member carried by the supporting means; motor means carried by the supporting means; mechanism interconnecting the motor means and the lid-lifting member for urging the lid-lifting member into lifting engagement with the journal box lid; and circuitry coupling the switch gear and the motor means.

3. Apparatus according to claim 2 in which the mechanism interconnecting the motor means and the lid-lifting member takes the form of a linkage.

4. Apparatus according to claim 2 in which the mechanism interconnecting the motor means and the lid-lifting member takes the form of a four-bar linkage.

5. Apparatus according to claim 2 in which the mechanism interconnecting the motor means and the lid-lifting member includes a cam and cam follower.

6. In apparatus for automatically lifting the lid of a railway car journal box, an elongated member provided at one end with means for engaging the lid to be lifted; operating mechanism including power means acting on said elongated member for lifting it out of idling position into lid-engaging position; means for actuating said operating mechanism, said means including switch gear for engagement by the railway car; and mounting means supporting said operating mechanism, elongated member and lid-engaging means for cyclical operation of said operating mechanism upon actuation by said switch gear.

7. Apparatus according to claim 6 in which the power means include an electric motor.

8. Apparatus according to claim 6 in which the power means takes the form of fluid pressure motors.

9. Apparatus according to claim 8 in which the fluid pressure motors take the form of power cylinders.

10. In apparatus for automatically lifting the lid of a railway car journal box, switch gear for engagement by the railway car; a supporting table; two spaced side pieces on the supporting table; crank means disposed in the space between the two side pieces; a tongue carried by the crank means; power means for moving the tongue into engagement with the lid to be lifted; and, for actuating the power means, circuitry connecting the switch gear and the power means.

11. Lid-lifting apparatus according to claim 10 in which the crank means provide pivotal support for the tongue.

12. Lid-lifting apparatus according to claim 11 in which a fluid pressure motor is used to operate the crank means.

13. Lid-lifting apparatus according to claim 11 in which an electric motor is used to operate the crank means.

14. Lid-lifting apparatus according to claim 13 in which a clutch intervenes between the motor and the crank means.

15. In apparatus for automatically lifting the lid of a railway car journal box, switch gear for engagement by the railway car; a supporting table; two spaced side pieces on the supporting table; crank means disposed in the space between the two side pieces; a carriage supported by the crank means; a tongue supported by the carriage; power means mounted on the carriage for moving the tongue into engagement with the lid to be lifted; and, for actuating the power means, circuitry connecting the switch gear and the power means.

16. Apparatus according to claim 15 in which the means for moving the tongue takes the form of a motor.

17. Apparatus according to claim 16 in which the motor, although mounted on the carriage, operates directly on the tongue.

18. In apparatus for automatically lifting the lid of a railway car journal box, switch gear for engagement by the railway car; a supporting table; spaced side pieces on the supporting table; a lid-engaging tongue disposed in the space between the side pieces; a movable carriage by which the tongue is supported; means on the side pieces by which the carriage is supported; and, spanning the space between the side pieces, means actuated by the switch gear for controlling the direction and extent of movement of the carriage.

19. Apparatus according to claim 18 in which the carriage control means take the form of cam slots in the side pieces and a cam follower connected to the carriage.

20. Apparatus according to claim 19 in which the carriage control means takes the form of a four-bar linkage.

References Cited in the file of this patent

UNITED STATES PATENTS

| | | |
|---|---|---|
| 1,332,797 | Brink | Mar. 2, 1920 |
| 1,507,064 | Jones | Sept. 2, 1924 |
| 2,345,728 | Claus | Apr. 4, 1944 |
| 2,345,620 | Mork | Apr. 4, 1944 |
| 2,433,225 | Kronoff | Dec. 23, 1947 |
| 2,525,572 | Woody | Oct. 10, 1950 |
| 2,879,350 | Howell | Mar. 24, 1959 |
| 2,911,111 | Grove | Nov. 3, 1959 |